April 17, 1962     L. A. CUMMINS     3,029,630
BOILER TUBE LEAK TESTER
Filed May 4, 1959
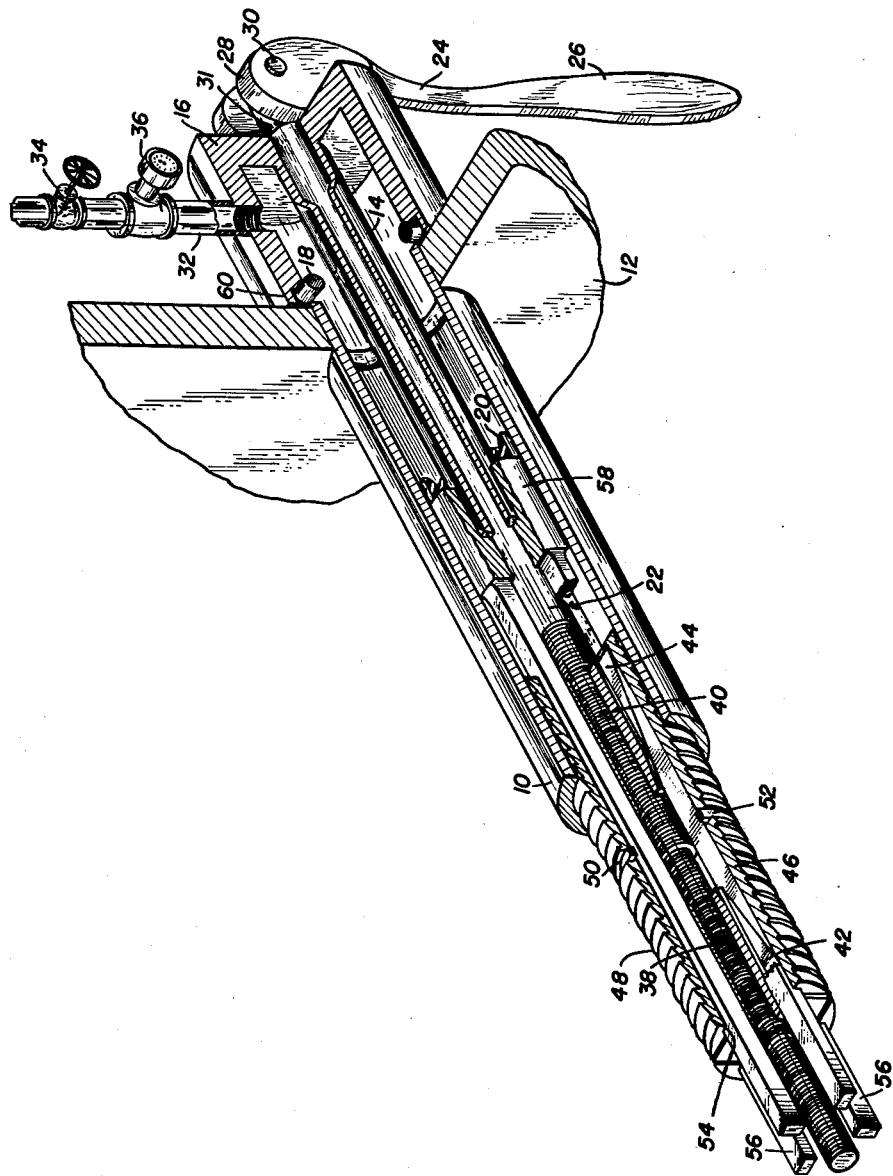
*INVENTOR.*
BY   *LAWRENCE A. CUMMINS*
Edward H. Lang
ATTORNEY United States Patent Office 3,029,630
Patented Apr. 17, 1962

3,029,630
BOILER TUBE LEAK TESTER
Lawrence A. Cummins, Toledo, Ohio, assignor to The Pure Oil Company, Chicago, Ill., a corporation of Ohio
Filed May 4, 1959, Ser. No. 810,678
2 Claims. (Cl. 73—46)

This invention relates to an apparatus for testing the tightness of joints between tubes and their supporting plates. Such joints are commonly found in boilers, condensers, and chemical process equipment. It is, of course, necessary that such joints should form a fluid-tight seal.

Previously, it was necessary after replacing a defective tube in a condenser to seal off the entire unit in order to test the joint between the replaced tube and the supporting plate; and if a leak was detected, it could not be determined whether this leak occurred at the replaced tube joint or at some other point in the condenser. A suitable leak tester should, therefore, isolate the joint to be tested from the rest of the apparatus.

O'Brien, Patent 2,342,616, discloses a leak tester capable of isolating the joint to be tested. This device consists of a sleeve with a bell-shaped skirt circling the major portion of the length of sleeve. One end of the sleeve extends a short distance beyond the open bell mouth of the skirt and is expanded or flanged to a diameter slightly smaller than that of the tube to be tested. A shaft similarly flanged extends through the bore of the sleeve and a washer consisting of rubber-like material is placed around this shaft and between the two flanges. Thus, this washer together with the flange portions of the sleeve and shaft can be inserted into the tube to be tested and the shaft retracted to compress the washer between the two flanges, causing it to expand radially to seal the bore of the condenser tube.

In operation, the flanged portions of the shaft and sleeve are inserted within the condenser tube and the bell mouth opening of the skirt held against the boiler plate around the joint between the plate and the tube.

A compressed gas is introduced through an aperture in the bell-like skirt and the pressure of this gas is measured over a period of time to determine if leakage occurs. Unfortunately, the usefulness of such devices of the prior art is limited in that the force available to support the bell-like skirt in contact against the condenser plate is very small. Therefore, it is difficult to obtain a good seal between the skirt and the condenser plate.

In testing joints in boilers or chemical equipment, it is often important that even minor leaks be detected. Boiler tubes especially are frequently designed to operate at very high pressures. It is, therefore, often desirable to test the joints in such equipment at pressures equal to the pressures at which the equipment is expected to operate.

It is an object of this invention to provide an apparatus to test for leaks at joints between a tube and a supporting plate at very high pressures equal to or greater than the pressures at which equipment is to be used. It is a further object of this invention to provide an apparatus for testing such joints which will provide an ample and forceful seal between the testing apparatus and the supporting plate. Another object of this invention is to provide an apparatus with which the great force required to hold the testing apparatus against high internal pressure can be easily and quickly applied. Other objects will become apparent from the following description.

Briefly, the apparatus of this invention consists of a sleeve, one end of which is expanded to form a cup-shaped flange. The sleeve and flange are equipped with seals so that the sleeve portion may be inserted in a boiler tube until the flange portion rests against the boiler plate, thereby isolating the joint between the tube and plate and forming a pressure vessel therewith. A gauge is used to measure the pressure in this vessel, and a leak is thus easily detected. The principal improvement over the devices of the prior art resides in the means employed to lock the flange forcefully in place and hold it there against great internal pressures.

A preferred embodiment of this invention is shown in the accompanying drawing which shows an isometric view, partly in cross-section, of the apparatus of this invention.

The drawing shows a boiler tube 10 supported by a steel boiler plate 12. The apparatus of this invention comprises a single unit insertable into the tube to be tested to seal off the end portion of the tube from within and also to seal against the supporting plate surrounding the joint between the plate and the tube. Thus, the apparatus cooperates with the boiler tube and its supporting plates to form a pressure vessel. The body of the apparatus consists of sleeve 14 and a cup-like flanged portion 16 formed at the outer end of the sleeve. Flange portion 16 contains an O-ring seal 18 which bears against plate 12. Seal 20, made of rubber or other fluid sealant such as synthetic elastomers, surrounds sleeve 14 and has a suitable outside diameter to engage and form a seal with tube 10. Rod 22 passes axially through sleeve 14 and is concentric therewith. Rod 22 is free to rotate or move axially within sleeve 14. However, no precise fit is required. Arm 24 is equipped with a handle portion 26 and a cam portion 28. Pin 30 passes through the center of cam 28 and attaches arm 24 securely to the external flattened end 31 of rod 22. The cam portion of arm 24 is preferably bifurcated to form double cams, one on each side of rod end 31. The end of the rod is preferably milled with two flats to accommodate the bifurcated portion of arm 24. It is at once apparent that arm 24 serves as a convenient means for both to rotate the rod 22 by rotating the arm about the rod as an axis, and to force the body portion of the sleeve 14 and flange 16 to slide axially with respect to rod 22. The latter is accomplished by the action of cam 28 against flange 16 when arm 24 is rotated about pin 30.

Tube 32 affords a means of introducing a compressed gas to the inside of the cup portion of flange 16. The flow of compressed gas is controlled by valve 34 and the pressure within the cup portion of the flange 16 may at any time be measured by test gauge 36.

An expansive-type locking device is mounted on the interior end of the rod 22, that is, the end which is insertable into boiler tube 10. This end of the rod is threaded with adjacent right-hand and left-hand threaded portions 38 and 40. These threads are of the type suitable for the transmission of heavy power loads, standard Acme threads being preferred. Two truncated right pyramid members 42 and 44 are threaded to the rod at threads 38 and 40, respectively. The pyramid members must be set in opposition to each other, that is, with the smaller bases of both pyramid members adjacent to each other. The two pyramid members are surrounded by four jaws 46. These jaws are segments of a hollow cylinder, the outside surfaces of the jaws being equipped with gripping teeth 48 and circumferential groove 50. The interior surfaces of the jaw segments are inclined to correspond with and contact the flat of pyramid members 42 and 44. The jaws are held in place against pyramids 42 and 44 by snap ring 52 which encircles the four jaws and is retained in position in groove 50.

Four equally spaced slots 54 are milled in pyramids 42 and 44. These slots are of sufficient width and depth to accommodate the four fingers 56 which are a part of the finger-ring member. This member consists of a ring portion 58 and four equally spaced finger portions 56 which are preferably integral with the ring portion of the member. The ring portion of the finger-ring member is pressed firmly in place on the inner end of sleeve 14 and is supported by sleeve 14. The ring portion 58 of the member also serves as a support for seal 20. The four slots 54 are of sufficient width and depth to accommodate the four fingers without binding.

In the use of the apparatus of this invention, the expansive locking mechanism and the major portions of rod 22 and sleeve 14 are inserted until O-ring 18 is just touching or adjacent to plate 12. Care must be taken to be sure that arm 24 is rotated about pin 30 so that the lower portion of the cam is in engagement with cup 16. Arm 24 is then rotated about rod 22 as an axis causing the rotation of rod 22 and forcing the pyramid members 42 and 44 to move towards each other along the threaded portion of rod 22. As pyramids 42 and 44 approach each other they force the movement of the four jaws 46 radially outward. When the teeth of the jaws engage the bore of the boiler tube sufficient torque is applied to handle 26 to set the teeth firmly in the tube bore. Arm 24 is then rotated about pin 30 causing cam 28 to force sleeve 14 and cup-shaped flange 16 to slide along the supporting rod until O-ring 18 is firmly and forcefully pressed against plate 12.

An important feature of this invention resides in the ability of the apparatus to lock itself firmly to the bore of the boiler tube before any force is applied to accomplish a seal between the cup-shaped flange and the plate. No axial force is applied to rod 22 or the expansive locking device until the locking device has been completely extended and firmly engaged in the boiler tube. This permits the locking jaws to set firmly and tightly in the boiler tube without sliding or scraping against the boiler tube bore as they are being set. The expansive locking device firmly holds rod 22 in place and prevents axial movement of the rod. This in cooperation with the mechanical advantage supplied by arm 24 and cam 28 permits cup-shaped flange 16 to be pressed against plate 12 with great force, achieving an effective and leak-proof seal at O-ring 18. A pressurized fluid such as air or other compressed gas is then admitted to the space enclosed by the cup-shaped flange, the sleeve, the seal, the boiler tube, and the supporting plate. The compressed gas enters this space through valve 34 and pipe 32. When the pressure within this space reaches the desired amount as indicated by test gauge 36, valve 34 is closed. The apparatus is then permitted to remain in place for a time and the pressure is again read at test gauge 36. A constant pressure indicates that no leakage has occurred, while a decrease in pressure indicates leakage between the joint of the boiler tube and the supporting plate. At the end of the test, valve 34 is again opened releasing the air pressure. Arm 24 is then rotated about pin 30, releasing flange 16 from contact with plate 12. Arm 24 is then rotated about rod 22 in a counterclockwise direction. This reverses the action of the threads and pyramid members and permits the jaws to retract radially away from the wall of the tube. Snap ring 52 which encircles the four jaws, presses the jaws radially inward and keeps them in contact with the truncated pyramids.

Seals 18 and 20 may be made of any suitable material but are preferably formed from a synthetic rubber. Internal pressure forces O-ring 18 out into contact with the supporting flange member at point 60. Seal 20 is so shaped that internal pressure forces it into tight sealing contact with the inside of the boiler tube and with the outside of supporting sleeve 14. Seal 20 is further supported by the ring portion 58 of the finger-ring member. The four fingers 56 of the finger-ring member serve to impede rotation of the pyramids 42 and 44, thus compelling them to move along the threads of rod 22 when rod 22 is rotated. The jaw segments are preferably also grooved to accommodate these fingers to prevent rotation of the jaw segments.

Care should be taken when locking the device to be sure that arm 24 is rotated with sufficient force to cause the teeth of the locking jaws to imbed themselves into and firmly engage the bore of the boiler tube. When this is done rod 22 is locked firmly in place. This permits the apparatus to be used under very high pressures in testing the joints of high pressure equipment. Important features of this invention are the rigid locking of rod 22 in place and the convenient means of applying the heavy force required to hold flange 16 against plate 12 to permit testing the joint at high pressures.

Jaw teeth 48 are preferably of saw-tooth cross-section and are disposed circumferentially around the jaw segments. The jaw segments should be assembled so that the teeth point outward and toward the handle end of the apparatus. Thus, when the teeth are brought firmly into contact with the bore of the tube, axial force applied by handle 24 will tend to cause the teeth to become more deeply imbedded in the tube bore. The possibility of slipping is thereby reduced to a minimum, even when very great axial force is applied.

What is claimed is:

1. An apparatus for testing for leakage at a point between a tube and a supporting plate, comprising a rod insertable into said tube, expansible means supported on one end of said rod and engageable with the bore of said tube to secure the rod tightly in position against axial movement, said expansible means being actuated by rotation of said rod, a sleeve slidably mounted on the rod, a cup-shaped flange affixed to the sleeve and movable with the sleeve into engagement with said plate, sealing means operatively supported on the sleeve and engageable with the bore of said tube to seal the tube and sleeve against flow of fluid therebetween, an arm pivotably secured at one end thereof to said rod, whereby leverage is provided for rotating said rod to actuate said expansible means when said rod and arm are substantially perpendicular, said arm including a cam portion at the pivotably secured end thereof for moving said cup shaped flange axially of said rod into fluid-tight engagement with said plate as said pivotably secured arm is rotated in a direction to change the angle between said rod and arm, means for admission of a compressed fluid into the space enclosed by said cup-shaper flange, plate, sleeve, tube, and tube sealing means, and means for measuring the pressure of the fluid in said space.

2. An apparatus according to claim 1 in which the expansive means comprises a pair of opposed truncated pyramidal members threaded to adjacent right-hand and left-hand thread portions of said rod, a plurality of jaws comprising hollow cylindrical segments interiorly shaped to engage the flat lateral faces of said pyramidal members and exteriorly engageable with the bore of a tube, means urging said jaws radially inward into contact with said pyramidal members, and means affixed to said sleeve and engageable with said pyramidal members to impede rotation of said pyramidal members.

References Cited in the file of this patent

UNITED STATES PATENTS

| | | |
|---|---|---|
| 2,342,616 | O'Brien | Feb. 22, 1944 |
| 2,475,748 | Leroy | July 12, 1949 |
| 2,669,802 | Nilsson | Jan. 18, 1955 |

FOREIGN PATENTS

| | | |
|---|---|---|
| 84,563 | Sweden | Oct. 8, 1935 |